US008102185B2

(12) United States Patent
Johansson et al.

(10) Patent No.: US 8,102,185 B2
(45) Date of Patent: Jan. 24, 2012

(54) SYSTEMS, DEVICES, AND METHODS FOR CONTROLLABLY COUPLING QUBITS (75) Inventors: Jan Johansson, Vancouver (CA); Andrew J. Berkley, Vancouver (CA)

(73) Assignee: D-Wave Systems Inc., Burnaby (CA)

( * ) Notice: Subject to any disclaimer, the term of this patent is extended or adjusted under 35 U.S.C. 154(b) by 774 days.

(21) Appl. No.: 12/242,133

(22) Filed: Sep. 30, 2008

(65) Prior Publication Data
US 2009/0192041 A1 Jul. 30, 2009

Related U.S. Application Data (60) Provisional application No. 61/024,125, filed on Jan. 28, 2008.

(51) Int. Cl.
*H01L 39/22* (2006.01)
*H03K 19/195* (2006.01)

(52) U.S. Cl. .............................................. 326/3; 326/6
(58) Field of Classification Search .................. 326/1–7, 326/104; 327/186, 367, 528
See application file for complete search history.

(56) References Cited

U.S. PATENT DOCUMENTS

| 4,051,393 | A | 9/1977 | Fulton | 307/306 |
|---|---|---|---|---|
| 4,496,854 | A | 1/1985 | Chi et al. | 307/306 |
| 4,937,525 | A | 6/1990 | Daalmans | 324/248 |
| 5,128,675 | A | 7/1992 | Harada | 341/133 |
| 6,605,822 | B1 | 8/2003 | Blais et al. | 257/34 |
| 6,627,916 | B2 | 9/2003 | Amin et al. | 257/31 |
| 6,753,546 | B2 | 6/2004 | Tzalenchuk et al. | 257/31 |
| 6,838,694 | B2 | 1/2005 | Esteve et al. | 257/34 |
| 6,984,846 | B2 | 1/2006 | Newns et al. | 257/31 |
| 7,051,393 | B2 | 5/2006 | Cox | 15/30 |
| 7,133,888 | B2 | 11/2006 | Kohn et al. | 708/446 |
| 7,268,576 | B2 * | 9/2007 | Amin | 326/3 |
| 7,335,909 | B2 | 2/2008 | Amin et al. | 257/34 |
| 7,605,600 | B2 | 10/2009 | Harris | 326/1 |
| 7,619,437 | B2 | 11/2009 | Thom et al. | 326/5 |
| 7,639,035 | B2 | 12/2009 | Berkley | 326/2 |
| 2003/0038285 | A1 | 2/2003 | Amin et al. | 257/31 |
| 2003/0071258 | A1 | 4/2003 | Zagoskin et al. | 257/31 |
| 2003/0224753 | A1 | 12/2003 | Bremond et al. | 455/339 |
| 2004/0016918 | A1 | 1/2004 | Amin et al. | 257/14 |
| 2005/0001209 | A1 | 1/2005 | Hilton et al. | 257/20 |
| 2005/0082519 | A1 | 4/2005 | Amin et al. | 257/13 |

(Continued)

FOREIGN PATENT DOCUMENTS

CA 2386426 5/2001

(Continued)

OTHER PUBLICATIONS

"A High-Level Look at Optimization: Past, Present and Future," e-Optimization.Community, May 2000, pp. 1-5.

(Continued)

*Primary Examiner* — Daniel D Chang
(74) *Attorney, Agent, or Firm* — Seed IP Law Group PLLC (57) ABSTRACT A transverse coupling system may include a first qubit, a second qubit, a first conductive path capacitively connecting the first qubit and the second qubit, a second conductive path connecting the first qubit and the second qubit, and a dc SQUID connecting the first and the second conductive paths wherein the compound junction loop is threaded by an amount of magnetic flux.

27 Claims, 4 Drawing Sheets

U.S. PATENT DOCUMENTS

| | | | |
|---|---|---|---|
| 2005/0250651 A1 | 11/2005 | Amin et al. | 505/846 |
| 2005/0256007 A1 | 11/2005 | Amin et al. | 505/170 |
| 2006/0097746 A1* | 5/2006 | Amin | 326/6 |
| 2006/0097747 A1* | 5/2006 | Amin | 326/6 |
| 2006/0147154 A1 | 7/2006 | Thom et al. | 385/37 |
| 2006/0225165 A1 | 10/2006 | Maassen van den Brink et al. | 977/933 |
| 2007/0180586 A1 | 8/2007 | Amin | 977/755 |
| 2008/0238531 A1 | 10/2008 | Harris | 327/528 |
| 2008/0258753 A1 | 10/2008 | Harris | 326/4 |
| 2008/0274898 A1 | 11/2008 | Johnson et al. | 505/190 |
| 2009/0078932 A1 | 3/2009 | Amin | 257/31 |

FOREIGN PATENT DOCUMENTS

| | | |
|---|---|---|
| WO | 2004/102470 | 11/2004 |
| WO | 2005/093649 | 10/2005 |
| WO | 2006/024939 | 3/2006 |

OTHER PUBLICATIONS

Allen et al., "Blue Gene: A Vision for Protein Science Using a Petaflop Supercomputer," *IBM Systems Journal* 40(2):310-327, 2001.

Amin et al., "Decoherence in Adiabatic Quantum Computation," arXiv:0708.0384v1 [cond-mat.mes-hall], pp. 1-4, Aug. 2, 2007.

Amin M.H., "Systems, Devices and Methods for Controllably Coupling Qubits," U.S. Appl. No. 60/975,083, filed Sep. 25, 2007.

Averin et al., "Variable Electrostatic Transformer: Controllable Coupling of Two Charge Qubits," *Physical Review Letters* 91(5):057003-1-057003-4, Aug. 1, 2003.

Berkley et al., "Scalable Superconducting Flux Digital-to-Analog Conversion Using a Superconducting Inductor Ladder Circuit," U.S. Appl. No. 60/917,884, filed May 14, 2007.

Berkley et al., "Systems, Methods and Apparatus for Local Programming of Quantum Processor Elements," U.S. Appl. No. 11/950,276, filed Dec. 4, 2007.

Berkley, A.J., "Architecture for Local Programming of Quantum Processor Elements Using Latching Qubits," U.S. Appl. No. 12/109,847, filed Apr. 25, 2008.

Biamonte et al., "Physical Implementations for a Universal Quantum Computer and Related Coupling Devices," U.S. Appl. No. 60/910,445, filed Apr. 5, 2007.

Biamonte et al., "Realizable Hamiltonians for Universal Adiabatic Quantum Computers," arXiv:0704.1287v1 [quant-ph], pp. 1-4, Apr. 10, 2007.

Biamonte et al., "Physical Realizations of a Universal Adiabatic Quantum Computer," U.S. Appl. No. 12/098,348, filed Apr. 4, 2008.

Blatter et al., "Design aspects of superconducting-phase quantum bits," *Physical Review B* 63:174511-1-174511-9, 2001.

Bocko et al., "Prospects for Quantum Coherent Computation Using Superconducting Electronics," *IEEE Transactions on Applied Superconductivity* 7(2):3638-3641, 1997.

Brennen et al., "Why Should Anyone Care About Computing with Anyons?," arXiv:0704.2241v1, pp. 1-19, Apr. 18, 2007.

Bunyk et al., "Systems, Methods and Apparatus for Digital-to-Analog Conversion of Superconducting Magentic Flux Signals," U.S. Appl. No. 12/120,354, filed May 14, 2008.

Butcher, "Advances in Persistent-Current Qubit Research: Inductively Coupled Qubits and Novel Biasing Methods," Graduate Thesis, Delft University of Technology, 52 pages, Jan. 10, 2002.

Choi, V., "Systems, Devices, and Methods for Analog Processing," U.S. Appl. 60/986,554, filed Nov. 8, 2007.

Choudhury, *Handbook of Microlithography, Micromachining and Microfabrication Vol. 1: Microlithography*, The International Society for Optical Engineering, Bellingham, WA, 1999.

Clarke et al., "Quiet Readout of Superconducting Flux States," *Physica Scripta. T102*:173-177, 2002.

Cosmelli et al., "Controllable Flux Coupling for the Integration of Flux Qubits," arXiv:cond-mat/0403690v1, pp. 1-10, Mar. 29, 2004.

Deutsch, "Quantum theory, the Church-Turing principle and the universal quantum computer," Appeared in *Proceedings of the Royal Society of London A 400*: 97-117, 1985.

Dolan et al., "Optimization on the NEOS Server," from *SIAM News* 35(6): 1-5, Jul./Aug. 2002.

Farhi et al., "Quantum Adiabatic Evolution Algorithms versus Simulated Annealing," MIT-CTP #3228, arXiv:quant-ph/0201031 vl, pp. 1-16, Jan. 8, 2002.

Feynman, "Simulating Physics with Computers," *International Journal of Theoretical Physics* 21(6/7):467-488, 1982.

Filippov et al., "Tunable Transformer for Qubits Based on Flux States," *IEEE Transactions on Applied Superconductivity* 13(2): 1-4, Jun. 2003.

Fourer et al., "Optimization as an Internet Resource," *Interfaces* 31(2):130-150, Mar./Apr. 2001.

Friedman et al., "Quantum superposition of distinct macroscopic states," *Nature* 406:43-46, Jul. 6, 2000.

Fritzsch et al., SNS and SIS Josephson junctions with dimensions down to the sub-µm region prepared by an unified technology, *Supercond. Sci. Tech.* 12: 880-882, 1999.

Ghiu et al., "Asymmetric two-output quantum processor in any dimension," arXiv:quant-ph/0610138v1, pp. 1-8, Oct. 17, 2006.

Harris et al., "Sign and Magnitude Tunable Coupler for Superconducting Flux Qubits," arXiv:cond-mat/0608253 v1, Aug. 11, 2006.

Harris, "Systems, Devices, and Methods for Controllably Coupling Qubits," Office Action mailed Sep. 3, 2009 for U.S. Appl. No. 12/017,995, 11 pages.

Harris, "Systems, Devices, and Methods for Controllably Coupling Qubits," Preliminary Amendment filed Jun. 18, 2009 for U.S. Appl. No. 12/017,995, 7 pages.

Harris, R.G., "Systems, Devices, and Methods for Controllably Coupling Qubits," U.S. Appl. No. 12/017,995, filed Jan. 22, 2008.

Hillery et al., "Approximate programmable quantum processors," arXiv:quant-ph/0510161v1, pp. 1-7, Oct. 20, 2005.

Hioe, *Quantum Flux Parametron—A Single Quantum Flux Superconducting Logic Device*, World Scientific Publishing Co. Pte. Ltd., Singapore, pp. 23-43, 1991.

Il'ichev et al., "Continuous Monitoring of Rabi Oscillations in a Josephson Flux Qubit," *Physical Review Letters* 91(9):097906-1-097906-4, week ending Aug. 29, 2003.

Inokuchi et al., "Analog Computation using Quantum-Flux Parametron Devices," *Physica C*, 357-360, pp. 1618-1621, Department of Electrical Engineering, Hokkaido University, Kita 13, Nishi 8, Sapporo 060-8628, Japan, Jan. 12, 2001.

International Search Report, mailed Jul. 18, 2008, for PCT/CA2008/000841, 4 pages.

International Search Report, mailed Jul. 25, 2008, for PCT/CA2008/000660, 4 pages.

International Search Report, mailed May 20, 2008, for PCT/CA2008/000138, 3 pages.

International Search Report, mailed Jan. 5, 2009, for PCT/CA2008/001724, 3 pages.

Ioffe et al., "Environmentally Decoupled sds-wave Josephson Junctions for Quantum Computing," *Nature* 398:679-681, 1999.

Johnson et al., "Systems, Devices, and Methods for Controllably Coupling Qubits," Office Action mailed Jul. 2, 2009, for U.S. Appl. No. 12/113,753, 9 pages.

Johnson et al., "Systems, Devices, and Methods for Controllably Coupling Qubits," Response filed Aug. 18, 2009, for U.S. Appl. No. 12/113,753, 4 pages.

Johnson et al., "Systems, Devices, and Methods for Controllably Coupling Qubits," Office Action mailed Nov. 17, 2009, for U.S. Appl. No. 12/113,753, 9 pages.

Johnson et al., "Systems, Devices, and Methods for Controllably Coupling Qubits," Amendment filed Feb. 12, 2010, for U.S. Appl. No. 12/113,753, 9 pages.

Kaiser et al., "Coherent Atomic Matter Waves: Proceedings of the Les Houches Summer School, Session LXXII in 1999," Springer-Verlag, New York, ISBN 286883499X, pp. 184-188, 294-295, 302-303.

Koch et al., "Model for 1/F Flux Noise in SQUIDs and Qubits," *Physical Review Letters* 98(26), 16 pages, 2007.

Levinson, *Principles of Lithography*, The International Society for Optical Engineering, Bellingham, WA, 2001.

Levitov et al., "Quantum spin chains and Majorana states in arrays of coupled qubits," arXiv:cond-mat/0108266v2, pp. 1-7, Aug. 19, 2001.

Maassen van den Brink et al., "Mediated tunable coupling of flux qubits," *New Journal of Physics* 7:1-18, 2005.

Madou, *Fundamentals of Microfabrication*, Second Edition, CRC Press LLC, Boca Raton, Florida, 2002.

Maibaum et al., "Systems, Methods and Apparatus for a Differential Superconducting Flux Digital-to-Analog Converter," U.S. Appl. No. 60/975,487, filed Sep. 26, 2007.

Maibaum et al., "Systems, Devices, and Methods for Analog Processing," U.S. Appl. No. 61/039,710, filed Mar. 26, 2008.

Majer et al., "Spectroscopy on Two Coupled Flux Qubits", arXiv:cond-mat/0308192 v1, Aug. 10, 2003.

Makhlin et al., "Quantum-State Engineering with Josephson-Junction Devices," *Reviews of Modern Physics* 73(2):357-400, Apr. 2001.

McHugh et al., "A quantum computer using a trapped-ion spin molecule and microwave radiation," arXiv:quant-ph/0310015v2, pp. 1-9, Apr. 13, 2004.

Mooij et al., "Josephson Persistent-Current Qubit," *Science* 285: 1036-1039, Aug. 13, 1999.

Nielsen, "Cluster-State Quantum Computation," arXiv:quant-ph/0504097v2, pp. 1-15, Jul. 1, 2005.

Nielsen et al., *Quantum Computation and Quantum Information*, Cambridge University Press, Cambridge, 2000, "7 Quantum Computers: Physical Realization," pp. 277-352.

Nielsen et al., *Quantum Computation and Quantum Information*, Cambridge University Press, Cambridge, 2000, "7.8 Other implementation schemes," pp. 343-345.

Orlando et al., "Superconducting Persistent-Current Qubit," *Physical Review B* 60(22):15 398-15 413, Dec. 1, 1999.

Paternostro et al., "Quantum-State Transfer in Imperfect Artificial Spin Networks," *Physical Review A* 71(4):042311, 2005.

Plourde et al., "Entangling flux qubits with a bipolar dynamic inductance," *Physical Review B* 70(140501-R): 1-4, 2004.

Rose et al., "Systems, Devices, and Methods for Interconnected Processor Topology," U.S. Appl. No. 12/013,192, filed Jan. 11, 2008.

Rose, G., "Analog Processor with Quantum Devices," U.S. Appl. No. 60/638,600, filed Dec. 23, 2004.

Ryan et al., "Characterization of complex quantum dynamics with a scalable NMR information processor," arXiv:quant-ph/0506085v2, pp. 1-4, Feb. 13, 2006.

Shirts et al., "Computing: Screen Savers of the Word Unite!," *Science Online* 290(5498): 1903-1904, Dec. 8, 2000.

Shnirman et al., "Low- and High-Frequency Noise from Coherent Two-Level Systems," *Physical Review PRL* 94(12) 4 pages, Apr. 1, 2005.

Shoji et al., "New fabrication process for Josephson tunnel junctions with (niobium nitride, niobium) double-layered electrodes," *Appl. Phys. Lett.* 41(11): 1097-1099, Dec. 1, 1982.

Shor, "Introduction to Quantum Algorithms," AT&T Labs—Research, arXiv:quant-ph/0005003 v2, pp. 1-17, Jul. 6, 2001.

Thaker et al., "Quantum Memory Hierarchies: Efficient Designs to Match Available Parallelism in Quantum Computing," arXiv:quant-ph/0604070v1, 12 pages, Apr. 10, 2006.

Van Zant, *Microchip Fabrication*, Fourth Edition, McGraw-Hill, New York, 2000.

Vlasov, "Von Neumann Quantum Processors," arXiv:quant-ph/0311196v1, pp. 1-8, Nov. 27, 2003.

Williams et al., *Explorations in Quantum Computing*, Springer, New York, Dec. 12, 1997, Chapter 11, "How to Make a Quantum Computer," pp. 241-265.

Written Opinion, mailed Jul. 18, 2008, for PCT/CA2008/000841, 5 pages.

Written Opinion, mailed Jul. 25, 2008, for PCT/CA2008/000660, 2 pages.

\* cited by examiner

SYSTEMS, DEVICES, AND METHODS FOR CONTROLLABLY COUPLING QUBITS

CROSS-REFERENCE TO RELATED APPLICATIONS

This application claims benefit under 35 U.S.C. 119(e) of U.S. Provisional Patent Application Ser. No. 61/024,125, filed Jan. 28, 2008, entitled "Systems, Devices, and Methods for Controllably Coupling Qubits", which is incorporated herein by reference in its entirety.

BACKGROUND

1. Field

The present systems, devices and methods generally relate to superconducting computing, for example analog or quantum computing employing processors that operate at superconducting temperatures.

2. Description of the Related Art

A Turing machine is a theoretical computing system, described in 1936 by Alan Turing. A Turing machine that can efficiently simulate any other Turing machine is called a Universal Turing Machine (UTM). The Church-Turing thesis states that any practical computing model has either the equivalent or a subset of the capabilities of a UTM.

A quantum computer is any physical system that harnesses one or more quantum effects to perform a computation. A quantum computer that can efficiently simulate any other quantum computer is called a Universal Quantum Computer (UQC).

In 1981 Richard P. Feynman proposed that quantum computers could be used to solve certain computational problems more efficiently than a UTM and therefore invalidate the Church-Turing thesis. See e.g., Feynman R. P., "Simulating Physics with Computers", International Journal of Theoretical Physics, Vol. 21 (1982) pp. 467-488. For example, Feynman noted that a quantum computer could be used to simulate certain other quantum systems, allowing exponentially faster calculation of certain properties of the simulated quantum system than is possible using a UTM.

Approaches to Quantum Computation

There are several general approaches to the design and operation of quantum computers. One such approach is the "circuit model" of quantum computation. In this approach, qubits are acted upon by sequences of logical gates that are the compiled representation of an algorithm. Circuit model quantum computers have several serious barriers to practical implementation. In the circuit model, it is required that qubits remain coherent over time periods much longer than the single-gate time. This requirement arises because circuit model quantum computers require operations that are collectively called quantum error correction in order to operate. Quantum error correction cannot be performed without the circuit model quantum computer's qubits being capable of maintaining quantum coherence over time periods on the order of 1,000 times the single-gate time. Much research has been focused on developing qubits with sufficient coherence to form the basic elements of circuit model quantum computers. See e.g., Shor, P. W. "Introduction to Quantum Algorithms", arXiv.org:quant-ph/0005003 (2001), pp. 1-27. The art is still hampered by an inability to increase the coherence of qubits to acceptable levels for designing and operating practical circuit model quantum computers.

Another approach to quantum computation, involves using the natural physical evolution of a system of coupled quantum systems as a computational system. This approach does not make use of quantum gates and circuits. Instead, the computational system starts from a known initial Hamiltonian with an easily accessible ground state and is controllably guided to a final Hamiltonian whose ground state represents the answer to a problem. This approach does not require long qubit coherence times. Examples of this type of approach include adiabatic quantum computation, cluster-state quantum computation, one-way quantum computation, quantum annealing and classical annealing, and are described, for example, in Farhi, E. et al., "Quantum Adiabatic Evolution Algorithms versus Simulated Annealing" arXiv.org:quant-ph/0201031 (2002), pp 1-24.

Qubits

As mentioned previously, qubits can be used as fundamental elements in a quantum computer. As with bits in UTMs, qubits can refer to at least two distinct quantities; a qubit can refer to the actual physical device in which information is stored, and it can also refer to the unit of information itself, abstracted away from its physical device.

Qubits generalize the concept of a classical digital bit. A classical information storage device can encode two discrete states, typically labeled "0" and "1". Physically these two discrete states are represented by two different and distinguishable physical states of the classical information storage device, such as direction or magnitude of magnetic field, current, or voltage, where the quantity encoding the bit state behaves according to the laws of classical physics. A qubit also contains two discrete physical states, which can also be labeled "0" and "1". Physically these two discrete states are represented by two different and distinguishable physical states of the quantum information storage device, such as direction or magnitude of magnetic field, current, or voltage, where the quantity encoding the bit state behaves according to the laws of quantum physics. If the physical quantity that stores these states behaves quantum mechanically, the device can additionally be placed in a superposition of 0 and 1. That is, the qubit can exist in both a "0" and "1" state at the same time, and so can perform a computation on both states simultaneously. In general, N qubits can be in a superposition of $2^N$ states. Quantum algorithms make use of the superposition property to speed up some computations.

In standard notation, the basis states of a qubit are referred to as the $|0\rangle$ and $|1\rangle$ states. During quantum computation, the state of a qubit, in general, is a superposition of basis states so that the qubit has a nonzero probability of occupying the $|0\rangle$ basis state and a simultaneous nonzero probability of occupying the $|1\rangle$ basis state. Mathematically, a superposition of basis states means that the overall state of the qubit, which is denoted $|\Psi\rangle$ has the form $|\Psi\rangle=a|0\rangle+b|1\rangle$ where a and b are coefficients corresponding to the probabilities $|a|^2$ and $|b|^2$, respectively. The coefficients a and b each have real and imaginary components, which allows the phase of the qubit to be characterized. The quantum nature of a qubit is largely derived from its ability to exist in a coherent superposition of basis states and for the state of the qubit to have a phase. A qubit will retain this ability to exist as a coherent superposition of basis states when the qubit is sufficiently isolated from sources of decoherence.

To complete a computation using a qubit, the state of the qubit is measured (i.e., read out). Typically, when a measurement of the qubit is performed, the quantum nature of the qubit is temporarily lost and the superposition of basis states collapses to either the $|0\rangle$ basis state or the $|1\rangle$ basis state and thus regaining its similarity to a conventional bit. The actual state of the qubit after it has collapsed depends on the probabilities $|a|^2$ and $|b|^2$ immediately prior to the readout operation.

Superconducting Qubits

There are many different hardware and software approaches under consideration for use in quantum computers. One hardware approach uses integrated circuits formed of superconducting materials, such as aluminum or niobium. The technologies and processes involved in designing and fabricating superconducting integrated circuits are similar to those used for conventional integrated circuits.

Superconducting qubits are a type of superconducting device that can be included in a superconducting integrated circuit. Superconducting qubits can be separated into several categories depending on the physical property used to encode information. For example, they may be separated into charge, flux and phase devices, as discussed in, for example Makhlin et al., 2001, *Reviews of Modern Physics* 73, pp. 357-400. Charge devices store and manipulate information in the charge states of the device, where elementary charges consist of pairs of electrons called Cooper pairs. A Cooper pair has a charge of 2e and consists of two electrons bound together by, for example, a phonon interaction. See e.g., Nielsen and Chuang, *Quantum Computation and Quantum Information*, Cambridge University Press, Cambridge (2000), pp. 343-345. Flux devices store information in a variable related to the magnetic flux through some part of the device. Phase devices store information in a variable related to the difference in superconducting phase between two regions of the phase device. Recently, hybrid devices using two or more of charge, flux and phase degrees of freedom have been developed. See e.g., U.S. Pat. No. 6,838,694 and U.S. Patent Application No. 2005-0082519.

Computational Complexity Theory

In computer science, computational complexity theory is the branch of the theory of computation that studies the resources, or cost, of the computation required to solve a given computational problem. This cost is usually measured in terms of abstract parameters such as time and space, called computational resources. Time represents the number of steps required to solve a problem and space represents the quantity of information storage required or how much memory is required.

Computational complexity theory classifies computational problems into complexity classes. The number of complexity classes is ever changing, as new ones are defined and existing ones merge through the contributions of computer scientists. The complexity classes of decision problems include:

1. P—The complexity class containing decision problems that can be solved by a deterministic UTM using a polynomial amount of computation time;

2. NP ("Non-deterministic Polynomial time")—The set of decision problems solvable in polynomial time on a non-deterministic UTM. Equivalently, it is the set of problems that can be "verified" by a deterministic UTM in polynomial time;

3. NP-hard (Nondeterministic Polynomial-time hard)—A problem H is in the class NP-hard if and only if there is an NP-complete problem L that is polynomial time Turing-reducible to H. That is to say, L can be solved in polynomial time by an oracle machine with an oracle for H;

4. NP-complete—A decision problem C is NP-complete if it is complete for NP, meaning that:

(a) it is in NP and (b) it is NP-hard, i.e., every other problem in NP is reducible to it. "Reducible" means that for every problem L, there is a polynomial-time reduction, a deterministic algorithm which transforms instances $I \in L$ into instances $c \in C$, such that the answer to c is YES if and only if the answer to I is YES. To prove that an NP problem A is in fact an NP-complete problem it is sufficient to show that an already known NP-complete problem reduces to A.

Decision problems have binary outcomes. Problems in NP are computation problems for which there exists a polynomial time verification. That is, it takes no more than polynomial time (class P) in the size of the problem to verify a potential solution. It may take more than polynomial time, however, to find a potential solution. NP-hard problems are at least as hard as any problem in NP.

Optimization problems are problems for which one or more objective functions are minimized or maximized over a set of variables, sometimes subject to a set of constraints. For example, the Traveling Salesman Problem ("TSP") is an optimization problem where an objective function representing, for example, distance or cost, must be optimized to find an itinerary, which is encoded in a set of variables representing the optimized solution to the problem. For example, given a list of locations, the problem may consist of finding the shortest route that visits all locations exactly once. Other examples of optimization problems include Maximum Independent Set, integer programming, constraint optimization, factoring, prediction modeling, and k-SAT. These problems are abstractions of many real-world optimization problems, such as operations research, financial portfolio selection, scheduling, supply management, circuit design, and travel route optimization. Many large-scale decision-based optimization problems are NP-hard. See e.g., "*A High-Level Look at Optimization: Past, Present, and Future*" e-Optimization.com, 2000.

Simulation problems typically deal with the simulation of one system by another system, usually over a period of time. For example, computer simulations can be made of business processes, ecological habitats, protein folding, molecular ground states, quantum systems, and the like. Such problems often include many different entities with complex interrelationships and behavioral rules. In Feynman it was suggested that a quantum system could be used to simulate some physical systems more efficiently than a UTM.

Many optimization and simulation problems are not solvable using UTMs. Because of this limitation, there is need in the art for computational devices capable of solving computational problems beyond the scope of UTMs. In the field of protein folding, for example, grid computing systems and supercomputers have been used to try to simulate large protein systems. See Shirts et al., 2000, *Science* 290, pp. 1903-1904, and Allen et al., 2001, *IBM Systems Journal* 40, p. 310. The NEOS solver is an online network solver for optimization problems, where a user submits an optimization problem, selects an algorithm to solve it, and then a central server directs the problem to a computer in the network capable of running the selected algorithm. See e.g., Dolan et al., 2002, *SIAM News* Vol. 35, p. 6. Other digital computer-based systems and methods for solving optimization problems can be found, for example, in Fourer et al., 2001, *Interfaces* 31, pp. 130-150. All these methods are limited, however, by the fact they utilize digital computers, which are UTMs, and accordingly, are subject to the limits of classical computing that inherently possess unfavorable scaling of solution time as a function of problem size.

BRIEF SUMMARY

A transverse coupling system may be summarized as a transverse coupling system including a first qubit, a second qubit a first current path including a first coupling capacitance and a second coupling capacitance connecting the first qubit and the second qubit, a second current path connecting the first qubit and the second qubit, and an inductance connecting the second current path to a node of the first current path, the node located between the first coupling capacitance and the second coupling capacitance.

At least one of the first current path and the second current path may be made from a superconducting material. The inductance may be a controllable inductance. The inductance may be provided by a dc SQUID threaded by an amount of magnetic flux. The dc SQUID may include a loop of superconducting material interrupted by a first Josephson junction and a second Josephson junction, a first lead connecting the loop of superconducting material to the first conductive path at the node between the first coupling capacitance and the second coupling capacitance, and a second lead connecting the loop or superconducting material to the second conductive path wherein current traveling from the first lead passes through at least one of the first Josephson junction and the second Josephson junction before reaching the second lead. The first qubit and the second qubit may be most weakly coupled with about $n\Phi_0$ magnetic flux threading the dc SQUID, where n is an integer. The first qubit and the second qubit may be most strongly coupled with about $$\left(n+\frac{1}{2}\right)\Phi_0$$

magnetic flux threads the dc SQUID. There may exists a coupling strength between the first qubit and the second qubit. The coupling strength may cause the first qubit and the second qubit to exhibit XX+YY coupling. At least one of the first qubit and the second qubit may be a superconducting flux qubit. The first qubit may include a first loop of superconducting material interrupted by a first at least one Josephson junction and wherein the second qubit may include a second loop of superconducting material interrupted by a second at least one Josephson junction. The first at least one Josephson junction, the second at least one Josephson junction and the inductance may be connected in parallel between the first conductive path and the second conductive path. The second conductive path may capacitively connect the first qubit and the second qubit. The second conductive path may be interrupted by a first auxiliary capacitance and a second auxiliary capacitance. The inductance may connect to the second conductive path at a second node positioned between the first auxiliary capacitance and the second auxiliary capacitance. The first auxiliary capacitance may take the form of a first discrete capacitor and the second auxiliary capacitance may take the form of a second discrete capacitor. The first auxiliary capacitance may take the form of a first parasitic capacitance associated with the first current path and the second auxiliary capacitance may take the form of a second parasitic capacitance associated with the first current path. The first coupling capacitance may take the form of a first discrete capacitor and the second coupling capacitance may take the form of a second discrete capacitor. The first coupling capacitance may take the form of a first parasitic capacitance associated with the first current path and the second coupling capacitance may take the form of a second parasitic capacitance associated with the first current path.

A method of transversely coupling a first qubit to a second qubit using a first conductive path interrupted by a first coupling capacitance and a second coupling capacitance connecting the first qubit and the second qubit, a second conductive path connecting the first and second qubit, and a controllable inductance connecting the first conductive path, connected between the first coupling capacitance and the second coupling capacitance, to the second conductive path may be summarized as including adjusting the controllable inductance there by varying a divider for signals going from the first qubit to the second qubit.

The controllable inductance may be provided by a dc SQUID threaded by an amount of flux and adjusting the controllable inductance may include varying the amount of flux threading the dc SQUID. The amount of flux may be about $n\Phi_0$ magnetic flux and the first qubit and the second qubit may be weakly coupled. The amount of flux may be about $$\left(n+\frac{1}{2}\right)\Phi_0$$

magnetic flux and the first qubit and the second qubit may be strongly coupled. At least one of the first qubit and the second qubit may be a superconducting flux qubit. There may exist an XX+YY coupling between the first qubit and the second qubit. Adjusting the controllable inductance there by varying a divider for signals going from the first qubit to the second qubit may control a coupling strength between the first qubit and the second qubit.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with analog processors, such as quantum processors, quantum devices, coupling devices and control systems including microprocessors and drive circuitry have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Transverse coupling between two qubits may be needed to solve QMA-complete problems. See e.g., Kempe et al., arXiv:quant-ph/0406180 (2004); and Oliveira et al., arXiv:quant-ph/0504050 (2005). For optimization problems, including a YY coupling with the initial Hamiltonian may change the quantum phase transition from first order to second order thereby making the computation time shorter. See e.g., Schutzhold et al., arXiv:quant-ph/0608017 (2006); and Schaller et al., arXiv:0708.1882 (2007). For a discussion of a method for the controlled transverse YY coupling of two Josephson charge qubits by means of a variable electrostatic transformer, see e.g., Averin et al., Physical Review Letters 91, 057003 (2003).

Figure 1:
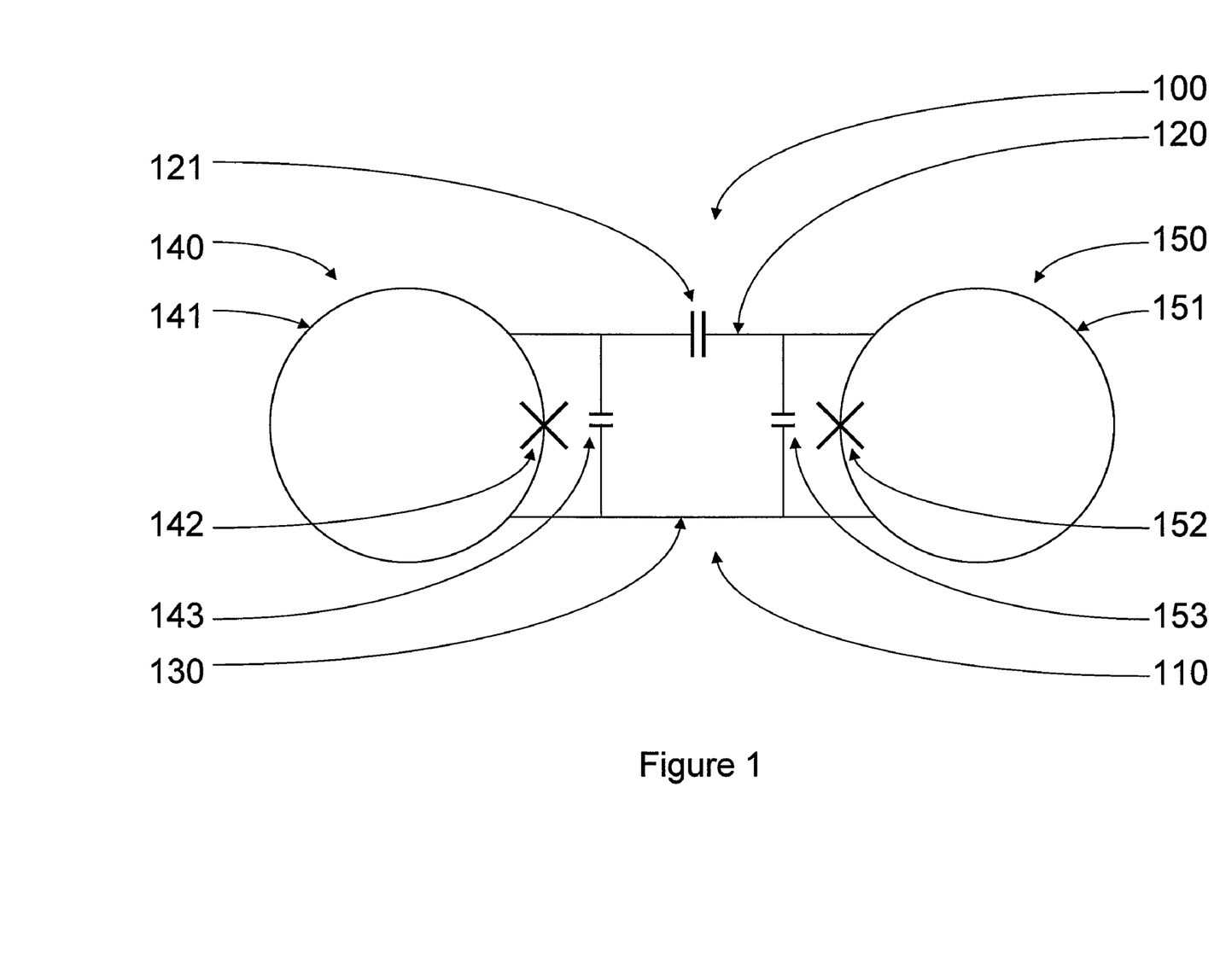
FIG. 1 is a schematic diagram of a transverse coupler.

FIG. 1 shows a system 100 that has a transverse coupler 110 capable of transverse XX+YY coupling between a qubit 140 and a qubit 150 and is used to transversely couple qubit 140 and qubit 150. Qubit 140 may be comprised of a loop of superconducting material 141 interrupted by a Josephson junction 142 having an intrinsic capacitance graphically represented by as capacitor symbol 143. Qubit 150 may be comprised of a loop of superconducting material 151 interrupted by a Josephson junction 152 having an intrinsic capacitance graphically represented by a capacitor symbol 153. Qubit 140 and qubit 150 are connected by a conductive path 120 and a conductive path 130. The conductive paths 120, 130 may, for example, take the form of one or more wires or traces of material that is superconducting below a critical temperature, to form superconductive paths. Superconducting path 120 is interrupted by a coupling capacitor 121 having a capacitance of magnitude $C_C$.

System 100 has Hamiltonian terms involving the charge (the capacitance) degree of freedom. This part of the Hamiltonian may be written as approximately:

$$H = -\left(C + \frac{C_c}{2}\right)\frac{\Phi_0}{4\pi}(\dot{\gamma}_1^2 + \dot{\gamma}_2^2) + \left(\frac{C_c}{2}\right)\frac{\Phi_0}{4\pi}(\dot{\gamma}_1^2 \dot{\gamma}_2^2) + \ldots$$

terms independent of C and $C_C$, where intrinsic capacitances 143, 153 are both of approximately equal magnitude and represented as C, coupling capacitance is represented as $C_C$, $\dot{\gamma}_1$ is the time derivative of the derivative of the phase across Josephson junction 142, $\dot{\gamma}_2$ is the time derivative of the derivative of the phase across Josephson junction 152, and $\Phi_0$ is the superconducting flux quantum. From the Hamiltonian above it is clear that this coupling is transverse (orthogonal to ZZ), where ZZ coupling is present within a Hamiltonian having $\gamma_1 \gamma_2$ terms.

It would be desirable if system 100 was tunable. Tunably coupling two superconducting charge qubits by means of a tunable capacitor is discussed in Averin et al., Physical Review Letters 91, 057003 (2003). Alternatively, by modifying system 100 to incorporate either a tunable inductance 211 and a capacitance 212, as is show in system 200 of FIG. 2, or a compound Josephson junction loop 315, as is shown in a system 300a of FIG. 3A and a system 300b of FIG. 3B, a tunable transverse coupler may be achieved.

Figure 2:
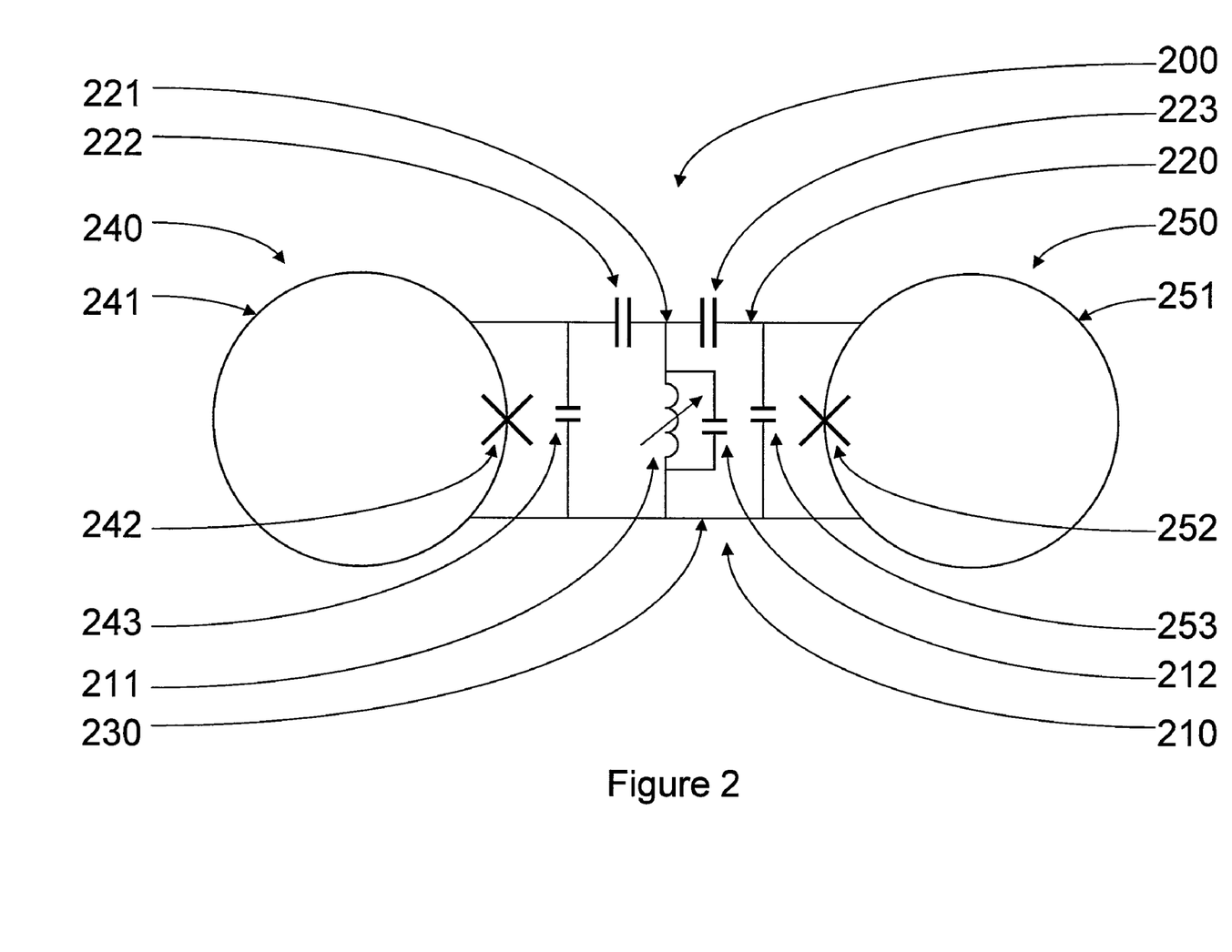
FIG. 2 is a schematic diagram of a controllable transverse coupler according to one illustrated embodiment.

One embodiment of the present system, devices and methods is shown in the schematic diagram of FIG. 2. A system 200 has a controllable transverse coupler 210 capable of transverse XX+YY coupling between a qubit 240 and a qubit 250 and is used to transversely couple qubit 240 and qubit 250. Qubit 240 may be comprised of a loop of superconducting material 241 interrupted by a Josephson junction 242 having an intrinsic capacitance graphically represented by a capacitor symbol 243. Qubit 250 may be comprised of a loop of superconducting material 251 interrupted by a Josephson junction 252 having an intrinsic capacitance graphically represented by a capacitor symbol 253. Qubit 240 and qubit 250 are connected by a conductive path 220 and a conductive path 230. The conductive paths 220, 230 may, for example, take the form of one or more wires or traces of material that is superconducting below a critical temperature, to form superconductive paths. Superconducting path 220 includes a coupling capacitance 222 and a coupling capacitance 223. The coupling capacitances 222, 223 may take the form of discrete capacitors. Alternatively, coupling capacitances 222, 223 may take the form of inherent, intrinsic or parasitic capacitances (commonly referred to as parasitic capacitance herein and in the claims) associated with the first superconducting path 220. Tunable inductance 211 and capacitance 212 connect superconducting path 220, at a node 221 located between coupling capacitors 222, 223, to superconducting path 230. The tunable inductance 211 may, for example, be provided by a tunable or adjustable inductor.

The tunability of controllable transverse coupler 210 is achieved by adjusting the impedance ($Z_{LC}$) shunting the path through coupling capacitors 222, 223. The total inductance shunting the path through coupling capacitors 222, 223 is tunable inductance 211 (L). The total capacitance shunting the path through coupling capacitors 222, 223 is capacitance 212(C). Therefore, the impedance ($Z_{LC}$) of controllable transverse coupler 210 is:

$$Z_{LC} = \frac{i\omega L}{1 - \omega^2 LC}.$$

The impedances $Z_C$ (the impedance due to either coupling capacitor 222 or 223) and $Z_{LC}$ form a divider for signals going form qubit 240 to qubit 250 with a ratio of:

$$\frac{Z_C}{Z_{LC}} = \frac{\omega^2 LC - 1}{\omega^2 LC_C},$$

where $C_C$ is coupling capacitance of coupling capacitors 222, 223.

Figure 3A:
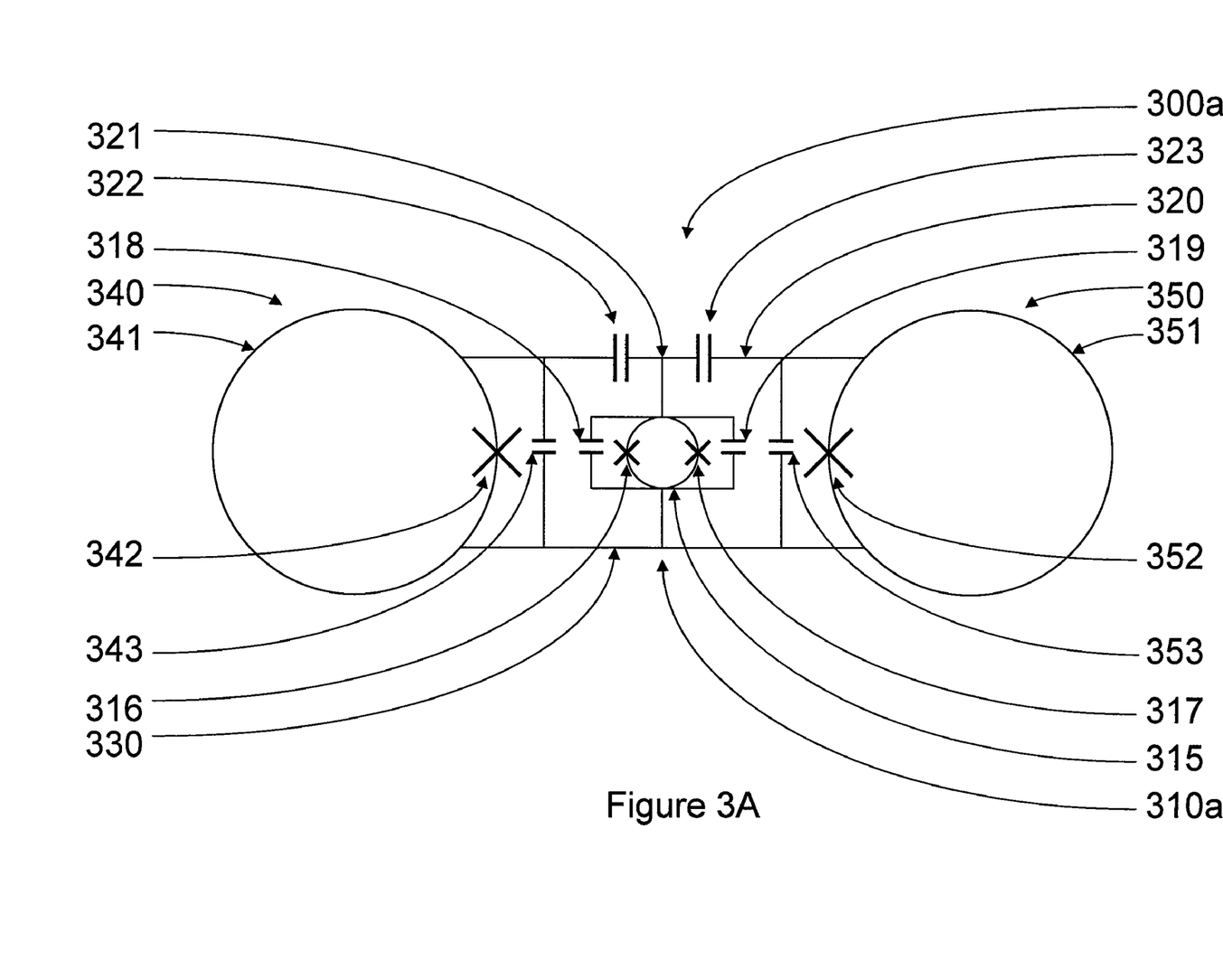
FIG. 3A is a schematic diagram of a controllable transverse coupler according to another illustrated embodiment.

One further embodiment of the present system, devices and methods is shown in the schematic diagram of FIG. 3A. A system 300a includes a controllable transverse coupler 310a capable of transverse XX+YY coupling between a qubit 340 and a qubit 350 and is used to transversely couple qubit 340 and qubit 350. Qubit 340 may be comprised of a loop of superconducting material 341 interrupted by a Josephson junction 342 having an intrinsic capacitance 343. Qubit 350 may be comprised of a loop of superconducting material 351 interrupted by a Josephson junction 352 having an intrinsic capacitance 353. Qubit 340 and qubit 350 are connected by a conductive path 320 and a conductive path 330. Conductive paths 320, 330 may, for example, take the form of one or more wires or traces of material that is superconducting below a critical temperature, to form superconductive paths. Superconducting path 320 includes a coupling capacitance 322 and a coupling capacitance 323. Coupling capacitances 322, 323 may take the form of discrete capacitors. Alternatively, coupling capacitances 322, 323 may take the form of inherent, intrinsic or parasitic capacitances associated with the first superconducting path 320. A compound Josephson junction loop 315, having a first Josephson junction 316 with an intrinsic capacitance graphically represented by a capacitor symbol 318 and a second Josephson junction 317 with an intrinsic capacitance graphically represented by a capacitor symbol 319, connects superconducting path 320, at a node 321 located between coupling capacitor 322 and coupling capacitor 323, to superconducting path 330. There may exist additional coupling capacitors along superconducting path 330. One coupling capacitor may along superconducting path 330 between qubit 340 and compound Josephson junction loop 315. There may be a voltage difference between the two leads of compound Josephson junction loop 315. Compound Josephson junction loop 315 may be seen as a shunt between superconducting paths 320, 330.

The tunability of tunable coupler 310a is achieved by adjusting the impedance shunting the path through coupling capacitors 322, 323. By changing the flux threading compound Josephson junction loop 315, the impedance ($Z_j$) shunting the path through coupling capacitors 322, 323 is changed. This impedance ($Z_j$) of compound Josephson junction loop 315 is given by the compound Josephson junction loop 315 inductance in series with the parallel combination of Josephson junction 316 inductance and Josephson junction 317 inductance and intrinsic capacitance 318 and intrinsic capacitance 319 ($C_j$). If the size of compound Josephson junction loop 315 is small, the total inductance (L) is small, and the total inductance (L) is given by the inductance of the Josephson inductance. Josephson inductance is known to be:

$$L_j = \frac{\Phi_0}{2\pi I_C \cos(2\pi \Phi_{ext}^{cpl})},$$

where $I_C$ is the critical current of compound Josephson junction loop 315, $\Phi_{ext}^{cpl}$ is the amount of flux threading compound Josephson junction loop 315, and $\Phi_0$ is the superconducting flux quantum.

Therefore, the impedance ($Z_j$) of compound Josephson junction 315 is:

$$Z_j = \frac{i\omega L_j}{1 - \omega^2 L_j C_j}.$$

The ratio of the impedance ($Z_C$) from qubit 340 thought to qubit 350 of system 300a to the impedance ($Z_j$) through compound Josephson junction loop 315 is:

$$\frac{Z_C}{Z_j} = \frac{\omega^2 L_j C_j - 1}{\omega^2 L_j C_C},$$

where $C_C$ is coupling capacitances 322, 323.

Therefore, by changing the amount of flux threading compound Josephson junction loop 315, the voltage divider formed by $Z_C$ and $Z_j$ is made more or less effective and the coupling strength is affected. The larger the amount of voltage drop across Josephson junction loop 315, the larger the coupling strength that exists between qubit 340 and qubit 350. By changing the amount of flux ($\Phi_{ext}^{cpl}$) threading compound Josephson junction 315 from about 0 to about $0.5\Phi_0$, Josephson inductance ($L_j$) changes from a minimum value to a maximum value and the coupling between qubit 340 and qubit 350 changes from a minimum coupling strength to a maximum coupling strength.

Figure 3B:
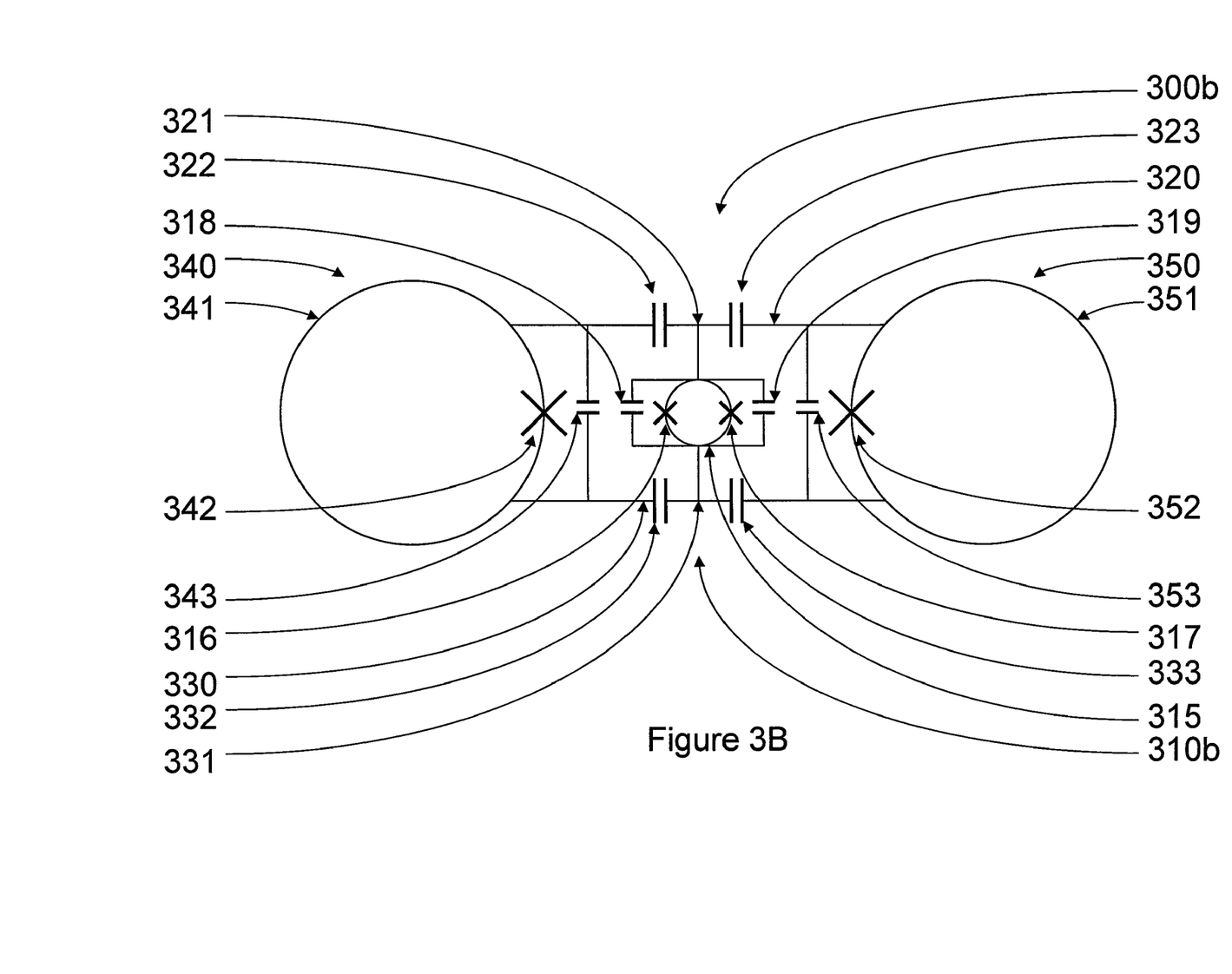
FIG. 3B is a schematic diagram of a controllable transverse coupler according to another illustrated embodiment.

Another embodiment of the present system, devices and methods is shown in the schematic diagram of FIG. 3B. A system 300b includes a controllable transverse coupler 310b capable of transverse XX+YY coupling between a qubit 340 and a qubit 350 and is used to transversely couple qubit 340 and qubit 350. Qubit 340 may be comprised of a loop of superconducting material 341 interrupted by a Josephson junction 342 having an intrinsic capacitance 343. Qubit 350 may be comprised of a loop of superconducting material 351 interrupted by a Josephson junction 352 having an intrinsic capacitance 353. Qubit 340 and qubit 350 are connected by a conductive path 320 and a conductive path 330. The conductive paths 320, 330 may, for example, take the form of one or more wires or traces of material that is superconducting below a critical temperature, to form superconductive paths. Superconducting path 320 includes a coupling capacitance 322 and a coupling capacitance 323. The coupling capacitances 322, 323 may take the form of discrete capacitors. Alternatively, the coupling capacitances 322, 323 may take the form of inherent, intrinsic or parasitic capacitances associated with the first superconducting path 320. Superconducting path 330 includes an auxiliary capacitance 332 and an auxiliary capacitance 333. Auxiliary capacitances 332, 333 may take the form of discrete capacitors. Alternatively, the coupling capacitances 322, 323 may take the form of inherent, intrinsic or parasitic capacitances associated with the first superconducting path 320. A compound Josephson junction loop 315, having a first Josephson junction 316 with an intrinsic capacitance graphically represented by a capacitor symbol 318 and a second Josephson junction 317 with an intrinsic capacitance graphically represented by a capacitor symbol 319, connects superconducting path 320, at a node 321 located between coupling capacitor 322 and coupling capacitor 323, to superconducting path 330, at a node 331 located between coupling capacitor 332 and coupling capacitor 333. Compound Josephson junction loop 315 is a dc SQUID loop with one of its leads connected to superconducting path 320 with its second lead connected to superconducting path 330. There may be a voltage difference between node 321 and node 331. Compound Josephson junction loop 315 may be seen as a shunt between superconducting path 320 and superconducting path 330.

The tunability of tunable coupler 310b is achieved by adjusting the impedance shunting the path through coupling capacitors 322, 323. By changing the flux threading compound Josephson junction loop 315, the impedance ($Z_j$) shunting the path through coupling capacitors 322, 323 is changed. This impedance ($Z_j$) of compound Josephson junction loop 315 is given by the compound Josephson junction loop 315 inductance in series with the parallel combination of Josephson junction 316 inductance and Josephson junction 317 inductance and intrinsic capacitance 318 and intrinsic capacitance 319 ($C_j$). If the size of compound Josephson junction loop 315 is small, the total inductance (L) is small, and the total inductance (L) is given by the inductance of the Josephson inductance. Josephson inductance is known to be:

$$L_j = \frac{\Phi_0}{2\pi I_C \cos(2\pi \Phi_{ext}^{cpl})},$$

where $I_C$ is the critical current of compound Josephson junction loop 315, $\Phi_{ext}^{cpl}$ is the amount of flux threading compound Josephson junction loop 315, and $\Phi_0$ is the superconducting flux quantum.

Therefore, the impedance ($Z_j$) of compound Josephson junction 315 is:

$$Z_j = \frac{i\omega L_j}{1 - \omega^2 L_j C_j}.$$

The ratio of the impedance ($Z_C$) from qubit 340 thought to qubit 350 of system 300a to the impedance ($Z_j$) through compound Josephson junction loop 315 is:

$$\frac{Z_C}{Z_j} = \frac{\omega^2 L_j C_j - 1}{\omega^2 L_j C_C},$$

where $C_C$ is coupling capacitances 322, 323.

Therefore, by changing the amount of flux threading compound Josephson junction loop 315, the voltage divider formed by $Z_C$ and $Z_j$ is made more or less effective and the coupling strength is affected. The larger the amount of voltage drop across Josephson junction loop 315, the larger the coupling strength that exists between qubit 340 and qubit 350. By changing the amount of flux ($\Phi_{ext}^{cpl}$) threading compound Josephson junction 315 from about 0 to about $0.5\Phi_0$, Josephson inductance ($L_j$) changes from a minimum value to a maximum value and the coupling between qubit 340 and qubit 350 changes from a minimum coupling strength to a maximum coupling strength.

One further embodiment of the present systems, devices and methods as seen in FIGS. 3A and 3B where compound Josephson junction 315 is replaced by two or more compound Josephson junctions in series. Having at least two compound Josephson junctions may allow for greater control over the inductance connecting superconducting wires 320, 330.

One of skill in the art would appreciate that at least one of Josephson junctions 142, 152, 242, 252, 342 or 352 may be replaced by a compound Josephson junction with little change to the dynamics of system 100, 200, 300a or 300b. At least one of qubit 140, 150, 240, 250, 340 or 350 may be a superconducting flux qubit.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other quantum processors and systems, not necessarily the exemplary quantum processors and systems generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. The present subject matter may, for example, be implemented via Application Specific Integrated Circuits (ASICs).

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to U.S. Pat. No. 6,838,694, U.S. Patent Publication No. 2005-0082519, US Patent Publication Number 2006-0225165, U.S. Provisional Patent Application Ser. No. 60/872,414 filed Jan. 12, 2007, entitled "System, Devices and Methods for Interconnected Processor Topology", U.S. Provisional Patent Application Ser. No. 60/956,104 filed Aug. 15, 2007 and entitled "Systems, Devices, and Methods for Interconnected Processor Topology", U.S. Patent Publication Number 2006-0147154, U.S. Provisional Patent Application Ser. No. 60/886,253 filed Jan. 23, 2007 and entitled "Systems, Devices, and Methods for Controllably Coupling Qubits", U.S. Provisional Patent Application Ser. No. 60/981,764, filed Oct. 22, 2007, entitled "Systems, Methods and Apparatus for Electronic Filters," U.S. Provisional Patent Application Ser. No. 60/979,031, filed Oct. 10, 2007, entitled "Systems, Methods and Apparatus for Multilayer Superconducting Printed Circuit Boards," and U.S. Provisional Patent Application Ser. No. 60/881,358 filed Jan. 18, 2007 and entitled "Input/Output System and Devices for Use with Superconducting Based Computing Systems," are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A transverse coupling system comprising:
   a first qubit;
   a second qubit;
   a first current path including a first coupling capacitance and a second coupling capacitance connecting the first qubit and the second qubit;
   a second current path connecting the first qubit and the second qubit; and
   an inductance connecting the second current path to a node of the first current path, the node located between the first coupling capacitance and the second coupling capacitance.

2. The transverse coupling system of claim 1 wherein at least one of the first current path and the second current path are made from a superconducting material.

3. The transverse coupling system of claim 1 wherein the inductance is a controllable inductance.

4. The transverse coupling system of claim 1 wherein the inductance is provided by a dc SQUID threaded by an amount of magnetic flux.

5. The transverse coupling system of claim 4 wherein the dc SQUID comprises:
   a loop of superconducting material interrupted by a first Josephson junction and a second Josephson junction;
   a first lead connecting the loop of superconducting material to the first conductive path at the node between the first coupling capacitance and the second coupling capacitance; and
   a second lead connecting the loop or superconducting material to the second conductive path wherein current traveling from the first lead passes through at least one of the first Josephson junction and the second Josephson junction before reaching the second lead.

6. The transverse coupling system of claim 5 wherein the first qubit and the second qubit are most weakly coupled with about $n\Phi_0$ magnetic flux threading the dc SQUID, where n is an integer.

7. The transverse coupling system of claim 5 wherein the first qubit and the second qubit are most strongly coupled with about $$\left(n + \frac{1}{2}\right)\Phi_0$$

magnetic flux threading the dc SQUID, where n is an integer.

8. The transverse coupling system of claim 1 wherein there exists a coupling strength between the first qubit and the second qubit.

9. The transverse coupling system of claim 8 wherein the coupling strength causes the first qubit and the second qubit to exhibit XX+YY coupling.

10. The transverse coupling system of claim 1 wherein at least one of the first qubit and the second qubit is a superconducting flux qubit.

11. The transverse coupling system of claim 1 wherein the first qubit comprises a first loop of superconducting material interrupted by a first at least one Josephson junction and wherein the second qubit comprises a second loop of superconducting material interrupted by a second at least one Josephson junction.

12. The transverse coupling system of claim 11 wherein the first at least one Josephson junction, the second at least one Josephson junction and the inductance are connected in parallel between the first conductive path and the second conductive path.

13. The transverse coupling system of claim 1 wherein the second conductive path capacitively connects the first qubit and the second qubit.

14. The transverse coupling system of claim 13 wherein the second conductive path is interrupted by a first auxiliary capacitance and a second auxiliary capacitance.

15. The transverse coupling system of claim 14 wherein the inductance connects to the second conductive path at a second node positioned between the first auxiliary capacitance and the second auxiliary capacitance.

16. The transverse coupling system of claim 14 wherein the first auxiliary capacitance takes the form of a first discrete capacitor and the second auxiliary capacitance takes the form of a second discrete capacitor.

17. The transverse coupling system of claim 14 wherein the first auxiliary capacitance takes the form of a first parasitic capacitance associated with the first current path and the second auxiliary capacitance takes the form of a second parasitic capacitance associated with the first current path.

18. The transverse coupling system of claim 1 wherein the first coupling capacitance takes the form of a first discrete capacitor and the second coupling capacitance takes the form of a second discrete capacitor.

19. The transverse coupling system of claim 1 wherein the first coupling capacitance takes the form of a first parasitic capacitance associated with the first current path and the second coupling capacitance takes the form of a second parasitic capacitance associated with the first current path.

20. The transverse coupling system of claim 1 wherein the inductance is provided by an at least two dc SQUID in series, each dc SQUID threaded by an amount of magnetic flux.

21. A method of transversely coupling a first qubit to a second qubit using a first conductive path interrupted by a first coupling capacitance and a second coupling capacitance connecting the first qubit and the second qubit, a second conductive path connecting the first and second qubit, and a controllable inductance connecting the first conductive path, connected between the first coupling capacitance and the second coupling capacitance, to the second conductive path, the method comprising:
   adjusting the controllable inductance there by varying a divider for signals going from the first qubit to the second qubit.

22. The method of claim 21 wherein the controllable inductance is provided by a dc SQUID threaded by an amount of flux and adjusting the controllable inductance includes varying the amount of flux threading the dc SQUID.

23. The method of claim 22 wherein the amount of flux is about $n\Phi_0$ magnetic flux and the first qubit and the second qubit are weakly coupled, where n is an integer.

24. The method of claim 22 wherein the amount of flux is about $$\left(n + \frac{1}{2}\right)\Phi_0$$

magnetic flux and the first qubit and the second qubit are strongly coupled, where n is an integer.

25. The method of claim 21 wherein at least one of the first qubit and the second qubit is a superconducting flux qubit.

26. The method of claim 21 wherein there exists an XX+YY coupling between the first qubit and the second qubit.

27. The method of claim 21 wherein adjusting the controllable inductance there by varying a divider for signals going from the first qubit to the second qubit controls a coupling strength between the first qubit and the second qubit.

\* \* \* \* \*